US007203963B1

(12) United States Patent
Wu et al.

(10) Patent No.: US 7,203,963 B1
(45) Date of Patent: Apr. 10, 2007

(54) METHOD AND APPARATUS FOR ADAPTIVELY CLASSIFYING NETWORK TRAFFIC

(75) Inventors: Shyhtsun Felix Wu, Davis, CA (US); Aiguo Fei, San Jose, CA (US); Fengmin Gong, Livermore, CA (US)

(73) Assignee: McAfee, Inc., Santa Clara, CA (US)

( * ) Notice: Subject to any disclaimer, the term of this patent is extended or adjusted under 35 U.S.C. 154(b) by 1048 days.

(21) Appl. No.: 10/172,740

(22) Filed: Jun. 13, 2002

(51) Int. Cl.
G06F 21/00 (2006.01)
G06F 9/00 (2006.01)
G06F 11/00 (2006.01)
H04L 29/02 (2006.01)

(52) U.S. Cl. .............................. 726/23; 726/3; 726/11; 709/224

(58) Field of Classification Search ...................... None
See application file for complete search history.

(56) References Cited

U.S. PATENT DOCUMENTS

| 5,557,742 A | 9/1996 | Smaha et al. |
|---|---|---|
| 5,621,889 A | 4/1997 | Lermuzeaux et al. |
| 5,769,942 A | 6/1998 | Maeda |
| 5,798,706 A | 8/1998 | Kraemer et al. |
| 5,805,801 A | 9/1998 | Holloway et al. |
| 5,812,763 A | 9/1998 | Teng |
| 5,864,683 A | 1/1999 | Boebert et al. |
| 5,892,903 A | 4/1999 | Klaus |
| 5,898,830 A | 4/1999 | Wesinger, Jr. et al. |
| 5,905,859 A | 5/1999 | Holloway et al. |
| 5,919,257 A | 7/1999 | Trostle |
| 5,919,258 A | 7/1999 | Kayashima et al. |
| 5,940,591 A | 8/1999 | Boyle et al. |
| 6,052,788 A | 4/2000 | Wesinger, Jr. et al. |
| 6,088,804 A | 7/2000 | Hill et al. |
| 6,119,236 A | 9/2000 | Shipley |

(Continued)

OTHER PUBLICATIONS

Giovanni Vigna, et al., "NetSTAT: A Network-Based Intrusion Detection System," Department of Computer Science, *University of California Santa Barbara*, pp. 1-46. Supported under Agreement No. F30602-97-1-0207.

(Continued)

*Primary Examiner*—Gilberto Barron, Jr.
*Assistant Examiner*—A. Nobahar
(74) *Attorney, Agent, or Firm*—Zilka-Kotab, PC; Christopher J. Hamaty

(57) ABSTRACT

A method of adaptively classifying information using a binary tree comprises establishing a binary tree including a set of binary sequences each representing one or more network addresses. Once network traffic is received having identifiers describing network traffic sources, the identifiers are correlated to binary sequences within the binary tree. A revision metric is formed based on this correlating, and the binary tree is then revised according to this revision metric.

A method of blocking a DDOS attack comprises establishing a binary tree including a set of binary sequences, each of these binary sequences representing one or more network addresses. When network traffic is received having identifiers describing network traffic sources, the identifiers are correlated to binary sequences within the binary tree. Once a DDOS attack notification signal is received, a selected binary tree path within the binary tree is identified as a low cost blocking path within the binary tree. Network traffic correlated to a binary sequence corresponding to the selected binary tree path is blocked.

21 Claims, 6 Drawing Sheets

U.S. PATENT DOCUMENTS

| | | | |
|---|---|---|---|
| 6,154,844 | A | 11/2000 | Touboul et al. |
| 6,178,509 | B1 | 1/2001 | Nardone et al. |
| 6,185,678 | B1 | 2/2001 | Arbaugh et al. |
| 6,185,689 | B1 | 2/2001 | Todd, Sr. et al. |
| 6,243,815 | B1 | 6/2001 | Antur et al. |
| 6,301,699 | B1 | 10/2001 | Hollander et al. |
| 2002/0009076 | A1* | 1/2002 | Engbersen et al. ......... 370/389 |
| 2003/0076848 | A1* | 4/2003 | Bremler-Barr et al. ..... 370/412 |
| 2004/0117478 | A1* | 6/2004 | Triulzi et al. ............... 709/224 |

OTHER PUBLICATIONS

Y. F. Jou, et al., and S.F. Wu, et al., "Design and Implementation of a Scalable Intrusion Detection System for the Protection of Network Infrastructure," *Advanced Networking Research*, MCNC, RTP, NC, et al., pp. 15.

Ivan Krsul, "Computer Vulnerability Analysis Thesis Proposal," The COAST Laboratory, Department of Computer Sciences, *Purdue University*, IN, Technical Report CSD-TR-97-026. Apr. 15, 1997, pp. 1-23.

Matt Bishop, "Vulnerabilities Analysis," Department of Computer Science, *University of California at Davis*, pp. 1-12.

Matt Bishop, "A Taxonomy of UNIX System and Network Vulnerabilities," *CSE-95-10*, May 1995, pp. 17.

Matt Bishop, et al., "A Critical Analysis of Vulnerability Taxonomies," *CSE-96-11*, Sep. 1996, pp. 1-14.

Dawn X. Song, et al., "Advanced and Authenticated Marking Schemes for IP Traceback," Report No. UCB/CSD-00-1107, Computer Science Division (EECS), *University of California*, Berkeley, Jun. 2000, pp. 1-11.

Chien-Lung Wu, et al., IPSec/PHIL (Packet Header Information List): Design, Implementation, and Evaluation, *NC State University*, Raleigh, NC, et al., pp. 6.

Allison Mankin, et al., "On Design and Evaluation of "Intention-Driven" ICMP Traceback," *USC/ISI*, et al., pp. 7.

Brian Carrier, et al., "A Recursive Session Token Protocol for Use in Computer Forensic and TCP Traceback," CERIAS, *Purdue University*, West Lafayette, IN, et al., 2002 IEEE, pp. 7.

Stefan Savage, et al., "Practical Network Support for IP Traceback," Department of Computer Science and Engineering, *University of Washington*, Seattle, WA. Copyright 2000, pp. 12.

Diheng Qu, et al., "Statistical Anomaly Detection for Link-State Routing Protocols," Computer Science Department, *North Carolina State University*, Raleigh, NC, et al.., Supported under Contract No. F30602-96-C-0325, pp. 9.

\* cited by examiner

METHOD AND APPARATUS FOR ADAPTIVELY CLASSIFYING NETWORK TRAFFIC

BRIEF DESCRIPTION OF THE INVENTION

This invention relates to computer network security. More specifically, this invention relates to a method and apparatus for adaptively partitioning information received from a network.

BACKGROUND OF THE INVENTION

Many networked computational resources such as computers, storage devices, switches, routers, and the like are vulnerable to distributed denial of service (DDOS) attacks. Such an attack typically involves a large number of remotely controlled computers that are used to deluge a target computer with an excessive amount of information. This information usually takes the form of specially crafted Internet Protocol (IP) packets that trigger a flood of packets at the target. The sheer number of such requests overwhelms the target's ability to respond, effectively removing it from service by preventing it from doing anything else. Compounding this problem is the fact that damage from such DDOS attacks is not limited to the target itself. Rather, attacks are also capable of overwhelming any networked device in the path leading to the target.

A typical DDOS attack is characterized by a sudden increase, or burst, in traffic volume, i.e. an increase in the rate (often measured in packets per second or bytes per second) at which information is transferred across a network to the target computer. As this attack is often made up of packets or other information arriving from a finite number of different attacking computers, one method of blocking DDOS attacks relies upon determining the sources of an attack and blocking information from these sources. However, it is often difficult to differentiate between benign information sent from computers not involved in a DDOS attack, and information sent as part of the attack itself. While one reliable approach for accomplishing such differentiation involves scanning the content of all information received, such an approach can involve a prohibitive amount of computational resources, especially during periods of high network traffic. It is therefore desirable to develop a method for partitioning information into categories based on whether it is involved in a DDOS attack, without scanning the content of the information received.

The ability to tell the difference between legitimate information and a DDOS attack is made more difficult by the fact that sources of network information may change over time, as some computers stop transmitting information to the target and others begin. It is therefore also desirable to develop a method for partitioning information that adapts to changes in the number and identity of computers transmitting information.

SUMMARY OF THE INVENTION

A method of adaptively classifying information using a binary tree comprises establishing a binary tree including a set of binary sequences each representing one or more network addresses. Once network traffic is received having identifiers describing network traffic sources, the identifiers are correlated to binary sequences within the binary tree. A revision metric is formed based on this correlating, and the binary tree is then revised according to this revision metric.

A method of blocking a DDOS attack comprises establishing a binary tree including a set of binary sequences, each of these binary sequences representing one or more network addresses. When network traffic is received having identifiers describing network traffic sources, the identifiers are correlated to binary sequences within the binary tree. Once a DDOS attack notification signal is received, a selected binary tree path within the binary tree is identified as a low cost blocking path within the binary tree. Network traffic correlated to a binary sequence corresponding to the selected binary tree path is blocked.

The invention is advantageous in that it establishes a binary sequence capable of identifying sources of a DDOS attack by examining the address, and not the content, of information sent. By avoiding an examination of such content, the methods of the invention can block the sources of a DDOS attack with minimal computational resources. The invention is further advantageous in that it revises the binary sequence to reflect changes in the computers contributing to the DDOS attack.

BRIEF DESCRIPTION OF THE DRAWINGS

For a better understanding of the nature and objects of the invention, reference should be made to the following detailed description taken in conjunction with the accompanying drawings, in which.

FIG .4 illustrates the formation of a binary sequence in accordance with an embodiment of the invention.

Figure 5:
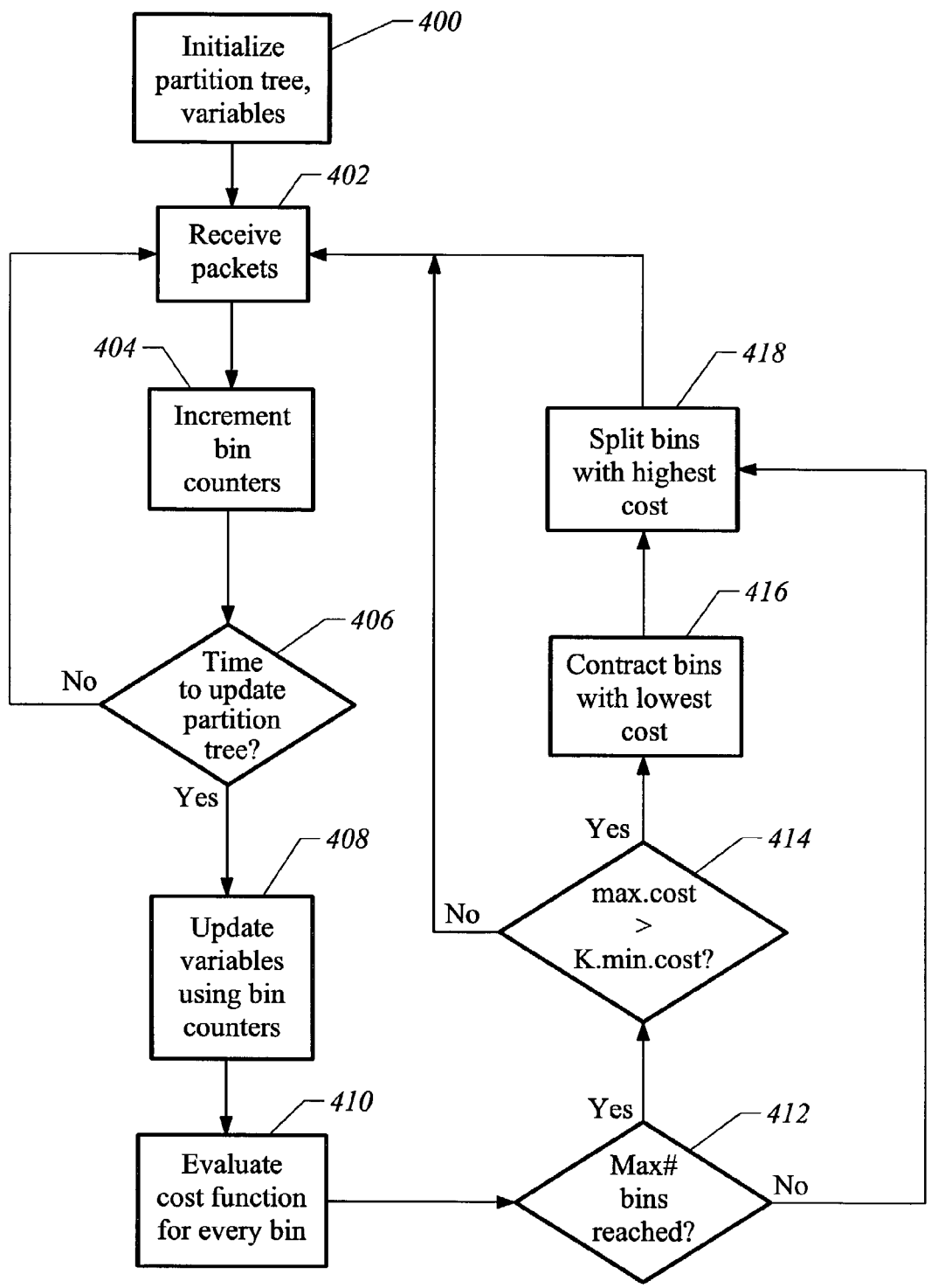

FIG. 5 illustrates processing steps associated with an embodiment of the present invention.

Figure 6:
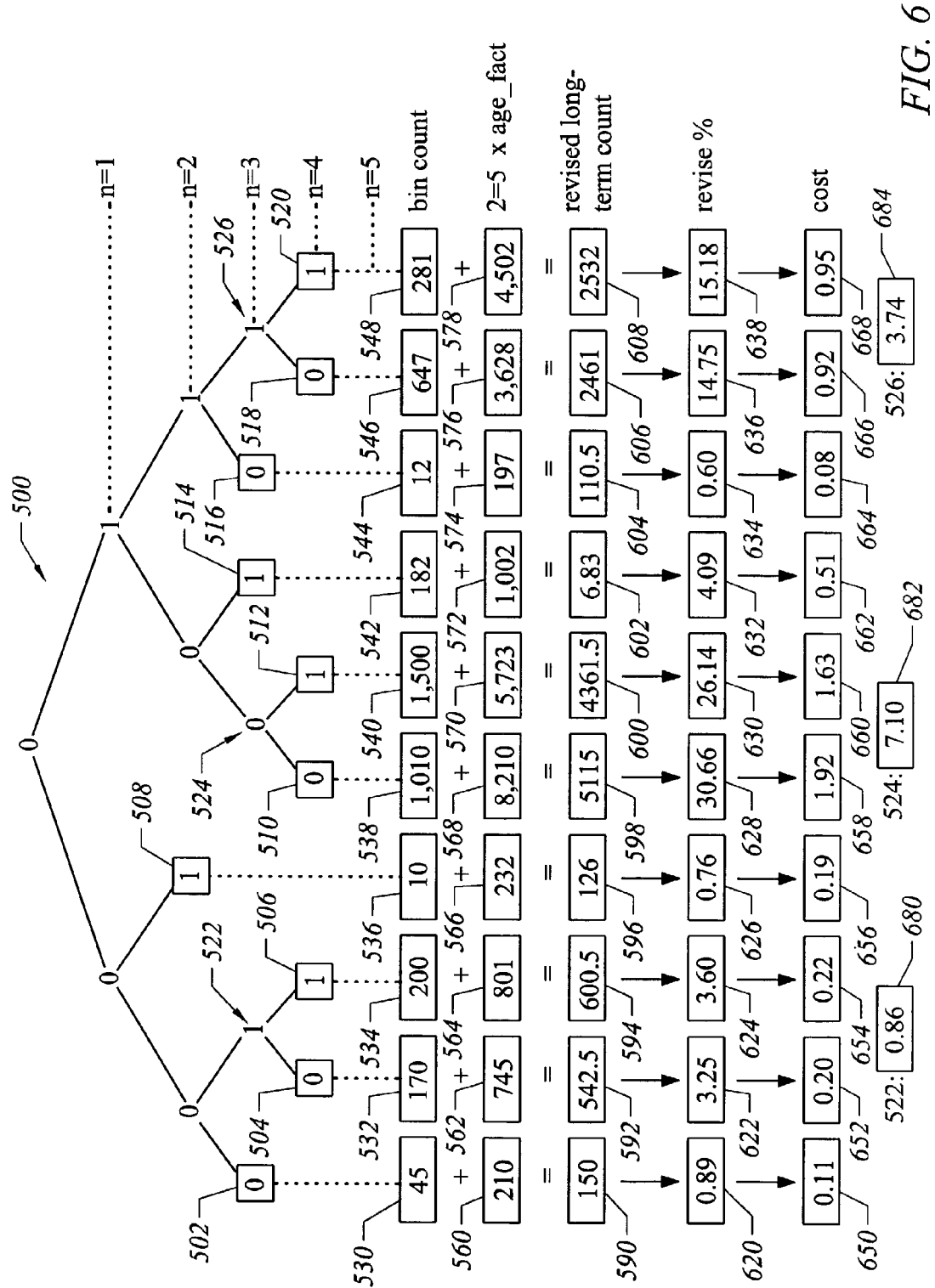

FIG. 6 illustrates the revising of a binary sequence in accordance with an embodiment of the invention.

Like reference numerals refer to corresponding parts throughout the several views of the drawings.

DETAILED DESCRIPTION OF THE INVENTION

Figure 1:
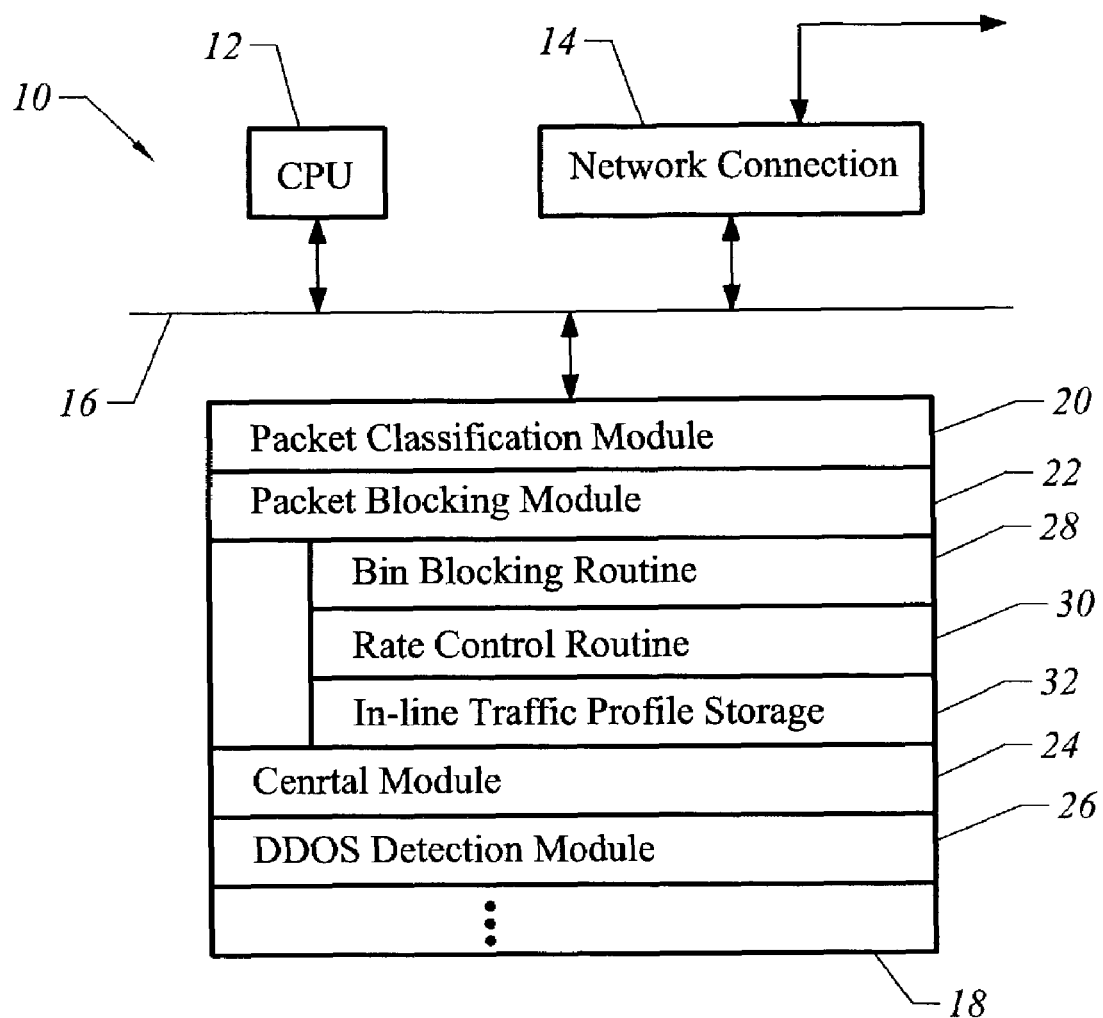
FIG. 1 illustrates a computer that may be operated in accordance with an embodiment of the present invention.

FIG. 1 illustrates a computer 10 that may be operated in accordance with an embodiment of the present invention. The computer 10 is a standard computer including a Central Processing Unit (CPU) 12 for processing instructions, and a network connection 14 for transmitting and receiving information from a computer network, each of which is connected by a bus 16. Also connected to the bus 16 is a memory 18. The memory 18 stores a number of computer programs, including a packet classification module 20, a packet blocking module 22, a control module 24, and a DDOS detection module 26. The packet blocking module 22 includes a number of components such as a bin blocking routine 28, rate control routine 30, and in-line traffic profile storage 32.

Figure 2:
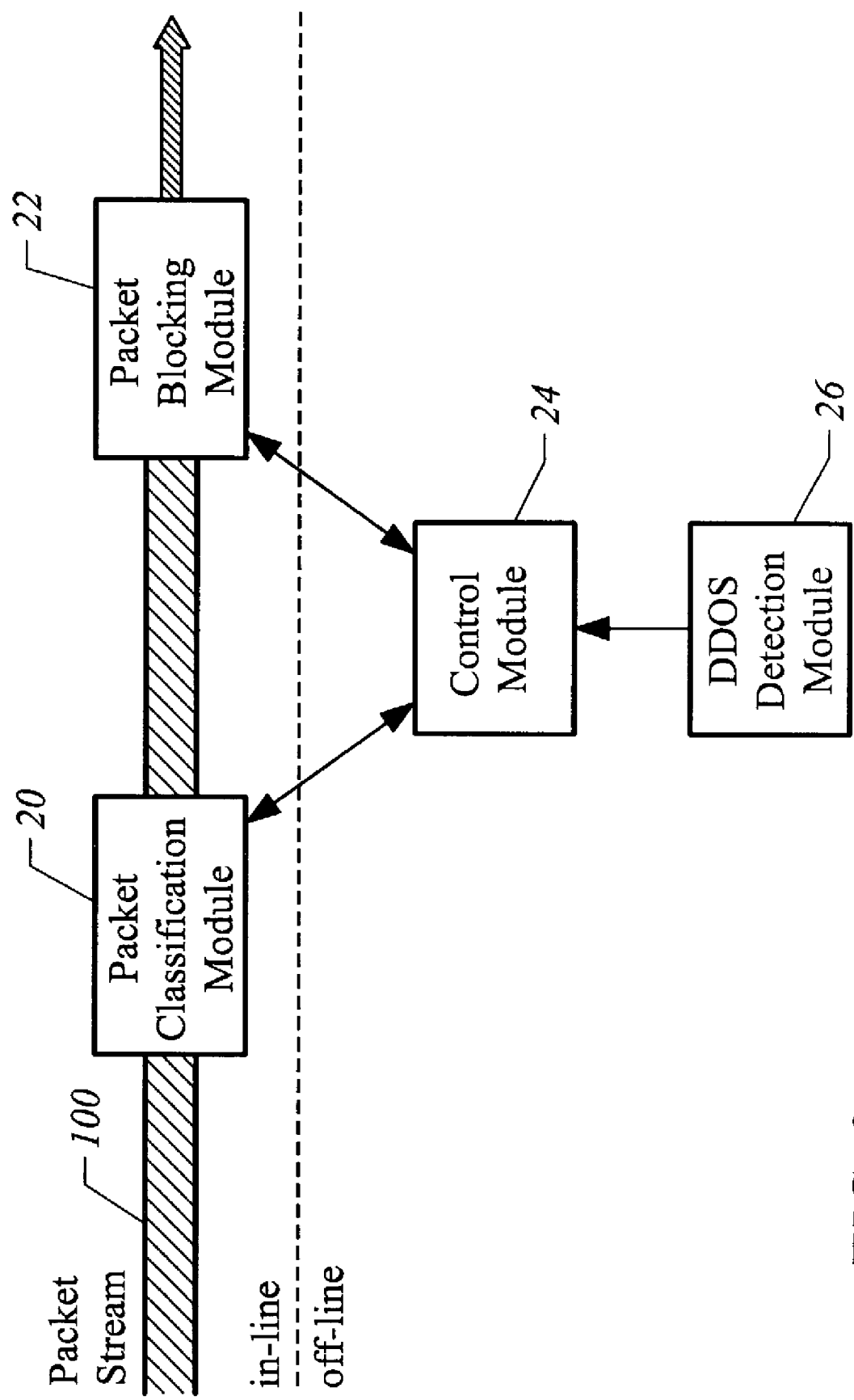
FIG. 2 illustrates the operation of an embodiment of the present invention.

FIG. 2 illustrates the operation of the computer 10 in accordance with an embodiment of the present invention. In operation, the computer 10 receives information, such as an IP packet stream 100, through its network connection 14. The packet classification module 20 then reads the IP addresses of these packets and classifies them using a binary tree, each branch of which is capable of classifying packets as belonging to a different category. A separate bin, or counter, is then used to keep count of the number of IP packets that match each branch. The count for each bin is stored in the in-line traffic profile storage 32, which provides a profile describing the various IP addresses transmitting IP packets to the computer 10, and the amount of traffic arriving from each address. From time to time, the control module 24 reads the count for each bin and uses this information to revise the binary tree and its associated bins. The revised tree is then transmitted back to the packet classification module 20, where it is used to monitor and classify the packet stream 100.

When the DDOS detection module 26 indicates a DDOS attack, the control module 24 signals the packet blocking module 22 to designate certain bins for blocking. Any IP packets falling into such blocked bins are then discarded. The packet blocking module 22 blocks bins either according to a simple bin blocking accomplished by the bin blocking routine 28, or according to a rate limiting scheme accomplished by the rate control routine 30.

The above discussion illustrates three basic functions of an embodiment of the present invention: 1) the classifying or partitioning of information into bins according to a binary tree, 2) the revising of this binary tree and its associated bins, and 3) blocking DDOS attack information according to the bins it is partitioned into. Attention now turns to a more detailed explanation of each of these three basic functions.

Figure 3:
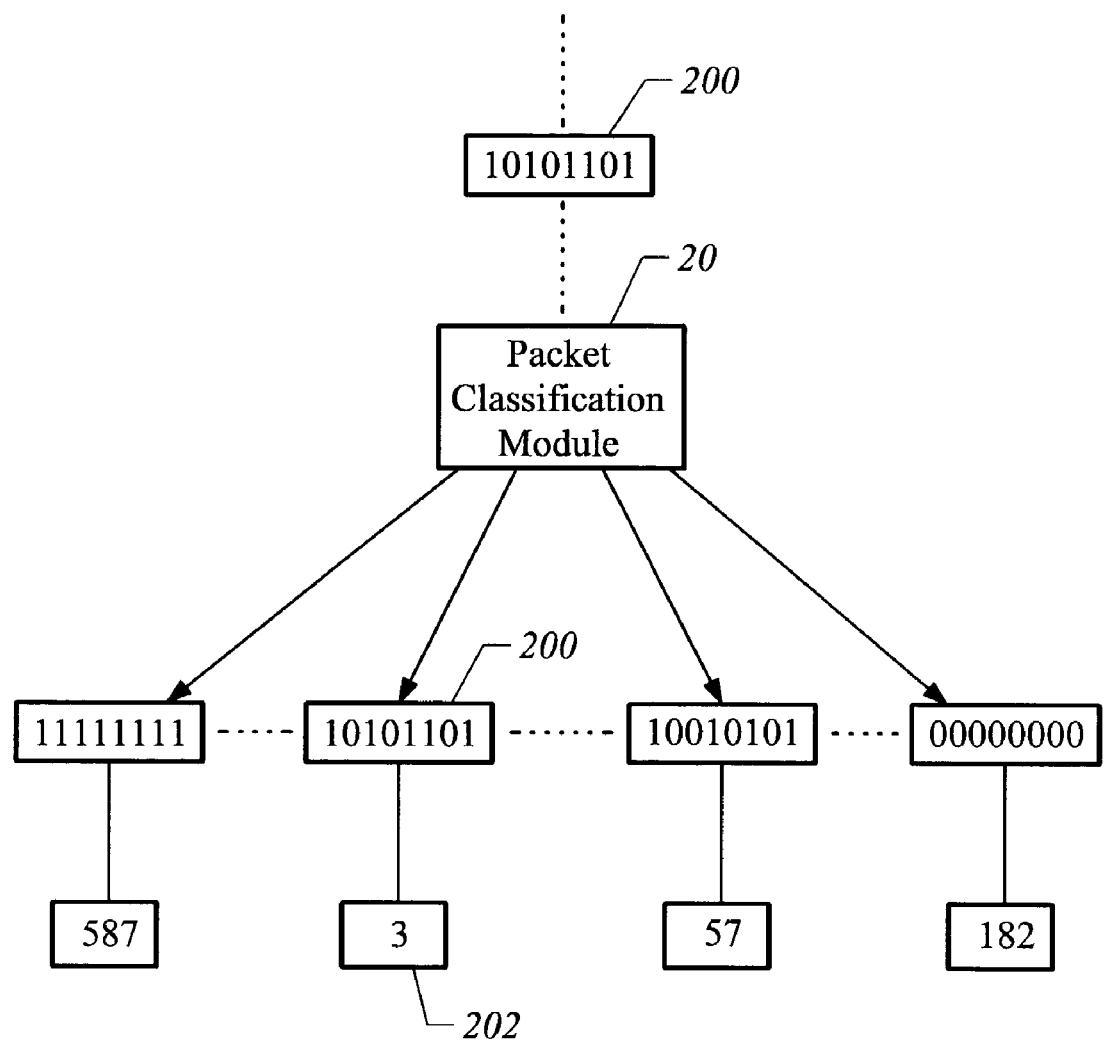
FIG. 3 illustrates the operation of an embodiment of the present invention.

The partitioning function is discussed first. FIG. 3 illustrates the operation of an embodiment of the present invention for partitioning information into bins. As information such as an IP packet arrives, it is partitioned into a bin according to its IP address or some other source identifier. The packet classification module 20 possesses a bin corresponding to every possible IP address. It thus reads the address 200 of an incoming IP packet (for simplicity, the address shown is 8 bits long), increments the appropriate bin 202, and passes the packet on. As each bin represents an IP address or group of IP addresses, the packet classification module 20 keeps a count of the amount of traffic arriving from various addresses.

It should be noted that the example of FIG. 3 has been simplified in a number of ways for the purpose of illustration, and should not be construed as so limited. For example, while the address 200 is represented as an 8 bit binary sequence, current IP addresses are 32 bits long. Obviously, the invention should be construed to cover the classification of IP packets according to addresses that are of arbitrary length, including those that are 8 bits, as well as 32 bits, in length. Likewise, while the address 200 is deemed as representing the address of an IP packet, the invention should be construed as including the classification of any form of networked information. Finally, the invention should not be limited to classifying and counting according to IP addresses. Rather, the address 200 should be considered as representative of any identifier capable of highlighting the origin or source of information.

Figure 4:
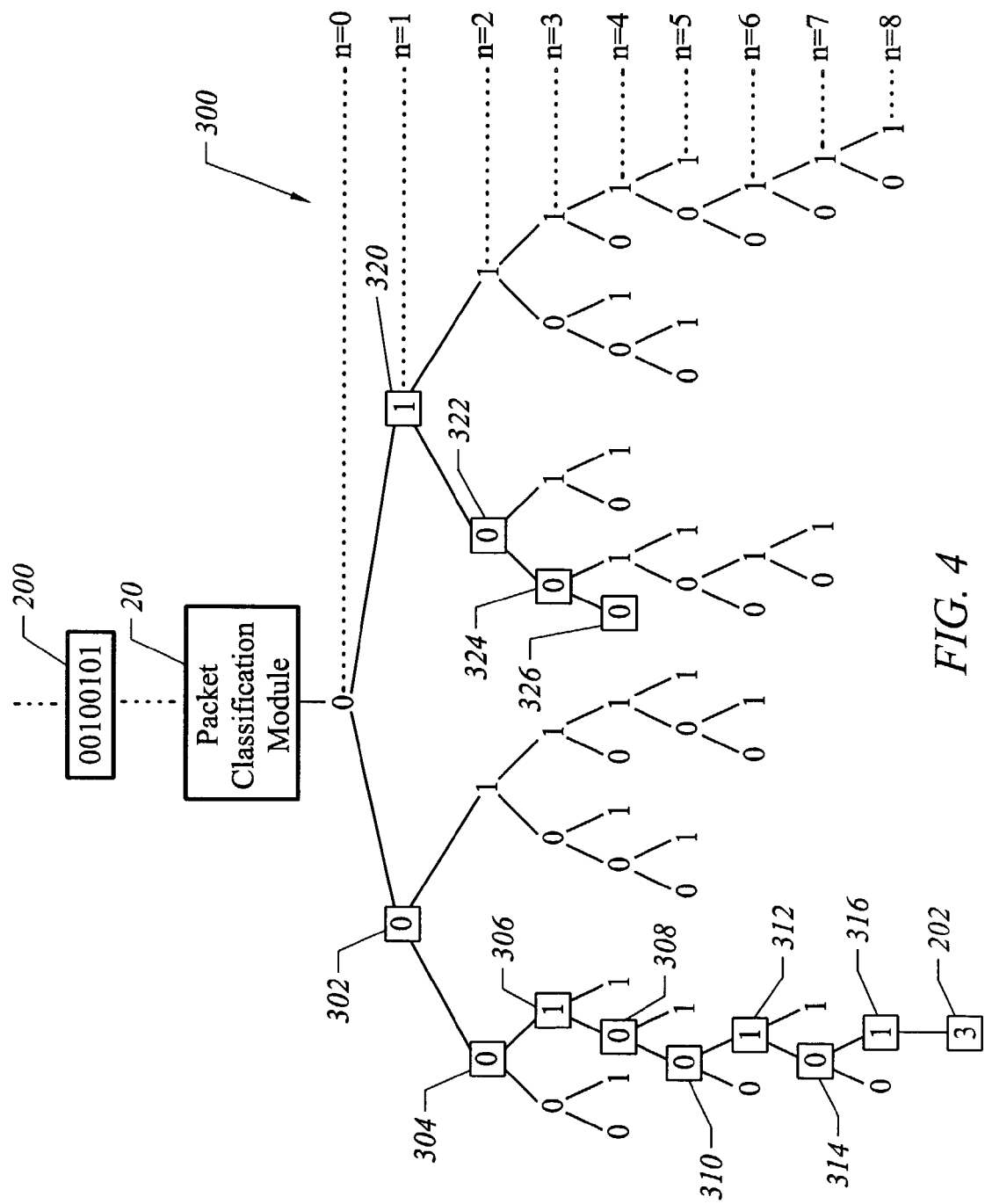

FIG. 4 illustrates further details of a binary sequence according to an embodiment of the present invention. A binary tree 300 is constructed, beginning with a binary 0 at the n=0 level, and branching into binary 0 and 1 nodes at the n=1 level. Each of these, in turn, branches into 0 and 1 nodes at the next level down, so that every level n has $2^n$ nodes, half of which have a value of 0 and half of which have a value of 1.

The lone binary 0 at the n=0 level is used simply to begin the binary tree, and is ignored for other purposes. By starting at the n=1 level and traversing down levels along any pathway, the pattern of nodes selected delineates a binary sequence that can be matched to an IP address or other binary information identifier. For example, the pattern of nodes 302–316 can denote, in order, the binary pattern 00100101, the same as the IP address 200. It can be seen, then, that each bottom-level node (also called a leaf node) represents an address or addresses. A corresponding bin 202 is associated with each leaf node to keep a count of the number of packets with addresses that match its sequence.

It should be observed that sequences of different length are capable of representing differing numbers of addresses, with shorter sequences representing more addresses and longer ones representing fewer. The sequence of nodes 302–316, for instance, defines an 8 bit binary sequence that can match only one 8-bit address: 00100101. The sequence of nodes 320–326, on the other hand, is only 4 bits in length: 1000. As such, it only matches the first 4 bits of an 8 bit address, and is thus capable of matching up to 16 different 8 bit addresses (e.g., 10000001, 10001010, 10001111, etc.). Depending on the length of each sequence, then, certain bins 202 are capable of representing many different addresses. It should also be observed that, because shorter sequences represent more addresses, such a binary tree covers the entire binary address space, i.e. the various leaf nodes collectively represent every possible address.

The packet classification module 20 uses a binary tree such as the tree 300 of FIG. 4 to determine the appropriate bin corresponding to each packet's IP address. It then increments the bin counter and passes the packet on. In the present example, the packet classification module 20 would read the address 200 of an incoming packet, compare the address 200 to the binary tree 300 to note that it matches the sequence 302–316, and increment the counter of the corresponding bin 202. The packet would then get passed on to the blocking module 22 for possible blocking, or to be simply passed along to its intended destination.

The partitioning of information according to a binary tree having been explained, attention now turns to revising the binary tree and its associated bins. As one embodiment of the invention blocks information according to the bin its address matches, it is helpful to effectively capture as much good (not involved in a DDOS attack) traffic in as few bins as possible, and to block the rest. Methods of adapting, or revising, the binary tree are now discussed that seek to maximize the amount of DDOS attack traffic blocked, while minimizing the amount of good traffic that also gets blocked in the process.

FIG. 5 illustrates processing steps associated with an embodiment of the invention for revising binary trees and their associated bins. A binary tree, which can also be termed a partition tree as it is used to partition network traffic, is first initialized (step 400). Also initialized are variables including a long_term_count array used to keep long-term track of the amount of traffic matching each sequence, and a bin_count array to keep short-term track of network traffic for each bin. A percent array is also used to calculate the percent of total traffic each bin accounts for.

The partition tree can be initialized in various ways, all of which are consistent with the invention. For example, if it is known beforehand that benign network traffic will arrive from certain addresses, the partition tree can be set at a specific configuration to match as much of this benign traffic with as few sequences as possible. The partition tree can also simply be initialized as an even tree with a given number of levels, where each level is fully populated. In the example of FIG. 4, the binary tree 300 can be initialized as an even tree that extends only down to the n=2 level. As such, it would have four bins, corresponding to IP addresses that begin with the digits 00, 01, 10, and 11.

Once the partition tree is initialized and bins have been established, the embodiment of the invention scans the source addresses of IP packets or other network information (step 402). It then compares their IP addresses or other identifiers to the various branches of the partition tree to determine a matching sequence, and increments the appropriate bin counter bin_count[i] (step 404).

From time to time, the partition tree is updated to reflect any changes in traffic. Typically, the partition tree is updated either at fixed time intervals or after a certain amount of network traffic has been received. A check is thus made to determine whether it is time to update the partition tree (step 406). If it is not, the method proceeds back to step 402 and continues to receive and process information in the usual manner. If the time has come to update the partition tree, the bin counters bin_count[i] are used to update various variables (step 408), which in turn are used to update the partition tree.

In short, the bin_count array is used to update the long_term_count array, which simply keeps a running count of the total amount of information counted in each bin. In pseudo-code, the algorithm for adding the bin_count array to the long_term_count array is as follows:

$$\begin{aligned}&\text{total\_count}=0 \text{ for } (i=1, N) \text{ long}_{13}\text{term\_count}[i]\\&\quad=\text{long}_{13}\text{ term\_count}[i]*\text{age\_factor}+\text{bin\_count}[i]\\&\text{total\_count}=\text{total\_count}+\text{long\_term\_term\_count}\\&\quad[i]\end{aligned} \quad (1)$$

where

N=total number of bins age_factor<1.0

In other words, the "old" long-term count array is discounted by an age factor to reduce the impact of older traffic count samples. The short-term count array is then added in, resulting in an updated long-term count array that contains all count information but that is also weighted toward more recent count information due to the age factor. The total_count value is simply a number reflecting the total amount of information received, such as the total number of IP packets received, with older count information discounted.

Observe that the long-term count array essentially keeps a running tally of all count information ever collected. On certain computers, this may eventually result in overflow errors as the accumulated count grows too big for the long-term count array to store. This problem can be alleviated by setting the age factor to a sufficiently small value, thus effectively decrementing each counter and preventing it from growing too large. The problem can also be addressed via other methods, all in keeping with the scope of the invention, such as periodically dividing every bin in the long-term count array by a multiple of some number like 10, or by subtracting a large constant from every bin. Finally, the problem is also easily solvable by choosing the correct precision value for each counter. For example, if a bin receives a packet every second and the profiles are updated every hour, a short-term counter will not exceed 60*60=3600. Over time, it can be observed that the upper bound on the total count corresponding to this bin is 3600/(1−age_factor). Thus, even if age_factor is set as large as 0.99999, a standard double precision counter (currently 8 bytes on most 32 bit machines) should not overflow.

Once the long-term count array is updated, each bin's percentage of network traffic is also revised as:

$$\text{percent}[i]=\text{long\_term\_count}[i]/\text{total\_count} \quad (2)$$

A cost function is then evaluated for every bin, as well as for any parent modes where both child nodes are leaf nodes, or leaf parents (step 410). This cost function is used as a revision metric to determine which, if any, bins (i.e., leaf nodes of the partition tree) should be updated, and is based on the following equation:

$$C[i]=\text{percent}[i]/2^n \quad (3)$$

where

C[i]=cost function for bin i n=depth, or level, or node i

It can be observed that the cost function measures both the percent of total traffic falling into a particular bin and the fraction of total address space, i.e., all possible addresses, that the bin covers. Note that the fraction of address space a bin covers is purely a function of the level at which it is located. For instance, in FIG. 4, node 304 is located at level n=2, and would cover one quarter of all possible address space, while node 316, at level n=8, would cover only $1/2^8=1/256$ of all address space. Consequently, bins with high cost values will tend to cover large amounts of address space and receive large amounts of network traffic, while bins with low cost values will typically cover little address space and receive small amounts of traffic.

Recall, however, that it is a goal to generate a partition tree that divides the greatest amount of traffic into the least amount of address space. This is accomplished by setting a maximum number of bins, or leaf nodes of the partition tree, and splitting those bins with the highest cost values until the maximum number of bins is reached. Thus, once the cost function is evaluated for every bin, the current number of bins is compared to the maximum number of bins (step 412). If the maximum number of bins has already been reached, a check is made to determine whether the highest cost value of all the leaf nodes, as calculated according to equation (3), is greater than a constant K times the lowest cost value of all leaf parent nodes (step 414). If not, the algorithm leaves the partition tree unchanged and returns to step 402. Otherwise, the two child nodes of the leaf parent with the lowest associated cost are contracted into the leaf parent (step 416). The node corresponding to the highest-cost bin then spawns two new nodes, with two new bins, beneath it (step 418).

If the maximum number of bins has not yet been reached, the method simply proceeds directly to step 418 instead of contracting other nodes first. If two nodes are merged into their leaf parent, as in step 414, their bin counts are added together to form the new bin count for the parent node. Conversely, if a node is split, its bin count is divided evenly, with each new bin receiving half of the old bin count.

As an aside, it should be noted that the invention, with regard to the number of bins, simply discloses a maximum number and nothing more. As a result, the maximum number of bins can be determined by any method, analytical, empirical, or otherwise, while remaining within the scope of the invention. Typically though, the maximum number is chosen empirically based on a balancing of at least two factors. First, a large maximum number can result in too many bins for the CPU 12 to process. Second, a small maximum number can result in too few bins with which to differentiate between good and bad traffic, resulting in the loss of too much benign network traffic whenever a bin is blocked. Accordingly, the maximum number is often chosen empirically, based on the individual traffic characteristics of a computer 10, in order to balance both these factors.

The methods of FIG. 5 are best illustrated by example. FIG. 6 illustrates the revising of a binary sequence according to the above methods. Here, a partition tree 500 has ten leaf nodes 502–520, each with a corresponding bin counter 530–548. Three leaf parents 522–526 also exist. Assume for purposes of this example that bin counters 530–548 have each tallied the number of IP packets shown. For each leaf node 502–520, these bin counters 530–548 indicate the number of IP packets that have arrived, with IP addresses matching each respective sequence, since the last revision of the partition tree 500.

Further assume that age_factor is assigned a value of 0.5, and K=2.0. Each long-term count bin 560–578, containing past accumulated bin count information, is first multiplied by 0.5 to account for its age. Each new value is then added to the value of the corresponding bin counter 530–548, producing revised long-term bin counters 590 . 608. These revised long-term bin counters 590–608 are subsequently used to calculate updated percentile values 620–638 according to equation (2), which in turn are used to calculate cost values 650–668 for each leaf node 502–520. Cost values 680–684 are also calculated for each leaf parent 522–526.

Notice that ten leaf nodes 502–520 currently exist. If the maximum number of bins is set to ten, meaning that this maximum has already been reached, then this embodiment of the invention seeks to contract two nodes while dividing another, thus keeping the total number of bins constant. Alternatively, the partition tree 500 remains unaltered. It must, then, be determined whether the maximum cost value is more than K times the minimum cost value. Here, the maximum cost value is cost value 658, which has a value of 1.92. This value is greater than 2.0 times the minimum cost value 680 of leaf parent 522, or 0.86. The two nodes 504, 506 are thus contracted into leaf parent (now a leaf node) 522. The highest cost leaf node 510 (now a leaf parent) is then split into two leaf nodes 0 and 1, located at the n=5 level. Each long-term count value is divided or combined accordingly. That is, the two long-term count values 592, 594 are combined to form a single long-term counter that has a value of 542.5+600.5=1143. Similarly, the counter 598 is divided evenly between the two new leaf nodes, where each is assigned a counter having a value of 5115/2=2557.5.

If the maximum number of bins is set to a number greater than ten, this embodiment of the invention instead seeks to divide the highest-cost leaf node without contracting any others. Here, node 510 would be divided as above, producing two new leaf nodes at the n=5 level, each having a bin counter set to a value of 2557.5. In either case, the short-term bin counters 530–548 are then set to zero, and the present embodiment uses the revised partition tree 500 to continue partitioning IP packets.

A third aspect of the invention, blocking information according to the bin it is partitioned into, is now discussed. Blocking typically occurs upon a signal from the DDOS detection module 26 that a DDOS attack has begun. Methods of detecting DDOS attacks are known in the art and include detection based on threshold information transfer rates and/or packet profiling. A novel approach to DDOS attack detection is also disclosed in a co-pending U.S. patent application entitled "Method and Apparatus for Detecting a Distributed Denial of Service Attack," filed on Jun. 13, 2002, hereby incorporated in its entirety. The present invention therefore includes the detection of DDOS attacks by any known method, including those described above.

Once the packet blocking module 22 receives an indication of a DDOS attack from the DDOS detection module 26 or another source, it can block incoming information, thus staving off the DDOS attack, in a number of ways. In one embodiment, the bin blocking routine 28 blocks information by sorting each bin according to its cost value, then blocking those bins with the lowest cost value. Observe that the numerator of equation (2) represents the percent of total traffic that falls into a particular bin, while the denominator represents the percent of all address space that the bin covers. Leaf nodes with low cost values receive relatively little benign traffic yet are capable of blocking a relatively large number of potential DDOS attack sources. In FIG. 6 for example, leaf node 508 covers ¼ of the address space, as it is one of only four nodes at the n=2 level. In actuality though, it receives far less traffic than this: 0.76%. Thus, even assuming that all 0.76% of this traffic is benign, blocking IP packets that match leaf node 508 blocks traffic from 25% of all possible DDOS attack sources, while only eliminating 0.76% of good traffic. In contrast, leaf nodes with high cost values receive a comparatively large amount of good traffic, and should not be blocked. For instance, while blocking leaf node 512 would prevent 26.14% of all good traffic from being received, an average of only 6.25% of all DDOS attack sources would be stopped.

One embodiment in accordance with this aspect of the invention thus sets a threshold percentage of benign traffic that can be blocked during a DDOS attack, and sorts all bins according to their cost values. When an indication of a DDOS attack is received, bins are blocked starting with the lowest-cost bin and successively progressing through the next-lowest cost bins until the threshold percentage of benign traffic has been blocked. The remaining bins, containing higher percentages of benign traffic, remain unblocked. In the example of FIG. 6, assume that the threshold percentage is set as 10%, i.e., it is considered acceptable to block up to 10% of network traffic during a DDOS attack, but no more. Upon an indication of a DDOS attack, this embodiment of the invention would first block traffic matching leaf node 516, as it has the lowest cost value 664. Here, 12.5% of all IP addresses are blocked, but only 0.60% of all benign traffic is actually lost. Next, leaf node 502 is also blocked, again blocking another 12.5% of all potential DDOS attacks but resulting in a total of 0.60%+0.89%=1.49% of benign traffic lost. Similarly blocked would be leaf nodes 508, 504, and 506 respectively, resulting in another 25%+6.25%+6.25%=37.5% of IP addresses blocked while blocking a total of 1.49%+0.76%+3.25%+3.60%=9.10% of good traffic. This embodiment would then stop here, as the next-lowest cost node, leaf node 514, would result in the loss of an additional 4.09% of good traffic, pushing the total percentage of lost traffic to 9.10%+4.09%=13.19%, well over the 10% maximum threshold.

Other embodiments also exist in accordance with this aspect of the invention. For example, the threshold can be set as an absolute amount of information received, instead of a percentage. In such an embodiment, the maximum threshold could be set as a bin count or long-term count value, and low-cost bins could be successively blocked until the total bin count or long-term count is reached.

Another embodiment blocks bins according to the rate at which they receive information. The flood of information arriving during a DDOS attack typically results in one or more bins receiving information at a high rate. Upon an indication of a DDOS attack then, the rate control routine 30 applies a rate-limiting scheme to block bins that receive information at or above a certain threshold rate. One embodiment that blocks bins in this manner utilizes a dual token bucket rate limiting scheme. Such schemes are known in the art for traffic policing. In this embodiment, a number of constants are first defined:

Total=running count of total number of packets, or other pieces of information, received by all bins
stderr=0.001, or some other small value (utilized in certain embodiments of the invention, as described below)

A number of arrays are also defined, each array having an element corresponding to each bin of the particular tree:
TokenRate1=token rate for first bucket
TokenDepth1=token depth for first bucket
TokenRate2=token rate for second bucket
TokenDepth2=token rate for second bucket
NTokens1=number of tokens for first bucket
NTokens2=number of tokens for second bucket
Index=index of the packet, or other piece of information, last seen for that bin Conceptually, the dual token bucket rate limiting scheme sets up two buckets of sorts, into which a stream of tokens is poured. As IP packets (or other information) arrive, a token is removed. If these packets arrive too quickly, the buckets are emptied of tokens, and remaining packets are blocked until the bucket fills again. The token rates, or the rate at which tokens are poured into the buckets, and token depths, or the number of tokens each bucket can hold, are thus used as parameters to allow the algorithm to control the rate at which each bin can receive packets.

Once an indication of a DDOS attack is received, the rate control routine 30 uses the dual token bucket scheme to limit the rate at which each bin receives packets. The two buckets for each bin i receive tokens as a function of packet arrival, instead of time. That is, each bucket receives a fixed number of tokens every time the computer 10 receives a packet. Thus, whenever a bin i receives a packet, the appropriate number of tokens is calculated and placed in its first bucket:

tokens=TokenRate1*[i]**(Total−Index[*i*]) NTokens1*[i]*
=NTokens1*[i]*+tokens

The number of tokens in each bucket, though, is capped by the depth of the bucket. In other words, the bucket can only contain a fixed number of tokens. Here, the first bucket is limited to TokenDepth1 tokens. If NTokens[i] exceeds this number, it is reduced to TokenDepth1 tokens instead. After that, the number of tokens is reduced by one to account for the newly arrived packet:

NTokens1*[i]*=Ntokens1*[i]*−1

If this operation results in Ntokens1[i] falling below 1, the newly arrived packet is blocked. If not, the packet is passed through the second bucket in the same fashion as above, although this bucket has a different token rate and bucket depth:

tokens=TokenRate2*[i]**(Total−Index[*i*])
NTokens2*[i]*=NTokens2*[i]*+tokens
if (NTokens2*[i]*>TokenDepth2*[i]*) then
   NTokens2*[i]*=TokenDepth2*[i]*
endif
if (Ntokens2*[i]*<1) then
   block packet
else
   NTokens2*[i]*=NTokens2*[i]*−1
endif It is worth noting that the invention utilizes dual token buckets to achieve superior performance over single token bucket schemes. The existence of two buckets allows constants to be chosen so as to optimize the performance of each bucket for different goals. For instance, TokenRate1 can be chosen as a small value while TokenDepth1 can be somewhat large, creating a first bucket that governs packet rates effectively. Conversely, TokenRate2 can then be chosen as a larger value and TokenDepth2 can be set at a small valve, allowing the second bucket to control packet bursts. Taken together, two buckets thus offer superior performance over a single token bucket. This does not, however, imply that single token bucket schemes are outside the scope of the invention. Rather, this aspect of the invention should be construed to include both single and dual token bucket rate limiting schemes.

From the above, it can be seen that the rate at which each bin allows or blocks packets can be controlled by properly selecting values for TokenRate1, TokenDepth1, TokenRate2, and TokenDepth2. In one embodiment, these constants are chosen as functions of the well-known standard deviation statistic. For each bin, a mean value can be calculated reflecting the average count that the bin contains over time. In conventional statistics, the standard deviation measuring the amount of variation in this mean value is defined as:

$$\sigma_i = \sqrt{\frac{\sum_{j=1}^{T}(x_j - x_{avg})^2}{T}} \quad (4)$$

where
T=total number of times bin i is sampled
$x_j$=$j^{th}$ bin count for bin i
$x_{avg}$=average of all T bin count samples for bin i This standard deviation is then used to calculate the two token rate and bucket size values as follows:

TokenRate1*[i]*=K1*(percent[*i*]+K2*$\sigma_j$)  (5)

TokenRate2*[i]*=K3*(percent[*i*]+K4*$\sigma_j$)  (6)

TokenDepth1*[i]*=K5*(percent[*i*]+K6*$\sigma_j$)  (7)

TokenDepth2*[i]*=K7*(percent[*i*]+K8*$\sigma_j$)  (8)

Here, this embodiment of the invention includes the determination of the various constants K1–K8 by any method. For instance, the constants K1–K8 can be determined empirically using rate samples from a number of DDOS attacks, or experimentally by establishing different values for each constant and determining the effectiveness of the resulting TokenRate and TokenDepth values for blocking DDOS attacks. Finally, the constants K1–K8 can be determined analytically using various mathematical criteria.

Calculating this standard deviation statistic requires the computer 10 to buffer T samples for each bin. As T must be statistically significant in order to represent an adequate measure of the degree to which a bin count can vary, a large amount of memory may be required. To alleviate this drawback, an alternate embodiment seeks to approximate σ in a less computationally intensive manner. Subsequent to the calculations of process (1) above, an approximation of the standard deviation is assessed:

if (total_bin_count>0) then
   for (i=1, N)
   total_bin_count=total_bin_count+bin_count[i]
   for (i=1, N)
   bin_sample=bin_count[i]/total_bin_count long_term_bin_count=long_term_count[i]/total_count
stderr[$i$]=sqrt{age_factor*stderr[$i$]$^2$+(1−age_factor)*
(bin_sample−long_term_bin_count)$^2$}

Here, a standard error statistic is calculated for each bin as a function of the difference between the percent of current traffic falling into that bin, and the percent of traffic that has historically fallen into that bin. Note that this is similar to the standard deviation statistic for each bin, which is a function of the difference between the bin count and the average of all bin count samples for that bin. Note also that equation (4) requires the buffering of T bin counts for every bin, whereas equation (9) does not. The stderr(i) quantity can then be used as a less computationally intensive approximation of σ in equations (5)–(8).

The foregoing descriptions of specific embodiments of the present invention are presented for purposes of illustration and description. They are not intended to be exhaustive or to limit the invention to the precise forms disclosed. Obviously, many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following claims and their equivalents define the scope of the invention.

What is claimed is:

1. A computer implemented method of adaptively classifying information using a binary tree, comprising:
    establishing a binary tree including a set of binary sequences, each binary sequence of said set of binary sequences representing one or more network addresses;
    receiving network traffic having identifiers describing network traffic sources;
    correlating said identifiers to binary sequences within said binary tree;
    forming a revision metric based upon said correlating; and
    revising said binary tree according to said revision metric;
    wherein said revising includes updating a particular binary sequence of said set of binary sequences so as to reduce the number of network addresses represented;
    wherein said updating includes determining said revision metric based upon the percentage of said network traffic having said identifiers correlating to said particular binary sequence, and based upon the number of network addresses within said one or more network addresses, said updating further including lengthening said particular binary sequence according to an evaluation of said revision metric.

2. The computer implemented method of claim 1 wherein said establishing includes establishing binary sequences each having a long term count value for noting an amount of said network traffic received from said one or more network addresses and a short term count value for updating said long term count value, and wherein said correlating includes incrementing said short term count value and periodically incorporating said short term count value into said long term count value.

3. The computer implemented method of claim 1 wherein said revising includes revising said set of binary sequences so as to correlate a greater number of said identifiers to a smaller number of said network addresses.

4. The computer implemented method of claim 1 further including the step of blocking said network traffic upon correlating said identifiers to selected binary sequences within said binary tree.

5. The computer implemented method of claim 4 wherein said receiving includes receiving malicious network traffic involved in a distributed denial of service attack and benign network traffic not involved in a distributed denial of service attack, and wherein said blocking includes identifying selected binary sequences for blocking a large amount of said malicious network traffic while blocking a small amount of said benign network traffic.

6. The computer implemented method of claim 4 wherein said correlating includes correlating said identifiers so as to produce identified network traffic, and said blocking includes blocking said identified network traffic according to the rate at which said identified network traffic is received.

7. The computer implemented method of claim 6 wherein said blocking includes blocking said identified network traffic according to a token bucket rate limiting scheme.

8. The computer implemented method of claim 6 wherein said blocking includes blocking said identified network traffic according to a dual token bucket rate limiting scheme.

9. A computer implemented method of blocking a distributed denial of service attack, comprising:
    establishing a binary tree including a set of binary sequences, each binary sequence of said set of binary sequences representing one or more network addresses;
    receiving network traffic having identifiers describing network traffic sources;
    correlating said identifiers to binary sequences within said binary tree;
    receiving a distributed denial of service attack notification signal;
    identifying a selected binary tree path within said binary tree, said identifying including identifying said selected binary tree path as a low cost blocking path within said binary tree;
    blocking network traffic correlated to a binary sequence corresponding to said selected binary tree path; and
    dynamically revising said set of binary sequences to reflect changes in said network traffic;
    wherein said dynamically revising includes updating a particular binary sequence of said set of binary sequences so as to increase the number of said network addresses represented;
    wherein said updating includes determining a revision metric based upon the percentage of said network traffic having said identifiers correlating to said particular binary sequence, and based upon the number of network addresses within said one or more network addresses, said updating further including shortening said particular binary sequence according to an evaluation of said revision metric.

10. A computer implemented method of blocking a distributed denial of service attack, comprising:
    establishing a binary tree including a set of binary sequences, each binary sequence of said set of binary sequences representing one or more network addresses;
    receiving network traffic having identifiers describing network traffic sources;
    correlating said identifiers to binary sequences within said binary tree;
    receiving a distributed denial of service attack notification signal;
    identifying a selected binary tree path within said binary tree, said identifying including identifying said selected binary tree path as a low cost blocking path within said binary tree;
    blocking network traffic correlated to a binary sequence corresponding to said selected binary tree path; and
    dynamically revising said set of binary sequences to reflect changes in said network traffic;

wherein said dynamically revising includes updating a particular binary sequence of said set of binary sequences so as to reduce the number of network addresses represented;

wherein said updating includes determining a revision metric based upon the percentage of said network traffic having said identifiers correlating to said particular binary sequence, and based upon the number of network addresses within said one or more network addresses, said updating further including lengthening said particular binary sequence according to an evaluation of said revision metric.

11. The computer implemented method of claim 9 wherein said blocking includes discarding said network traffic based upon the result of said correlating.

12. A computer readable memory that can direct a computer to function in a specified manner, comprising:

instructions to establish a binary tree including a set of binary sequences, each binary sequence of said set of binary sequences representing one or more network addresses;

instructions to receive network traffic having identifiers describing network traffic sources;

instructions to correlate said identifiers to binary sequences within said binary tree;

instructions to form a revision metric based upon said correlating; and instructions to revise said binary tree according to said revision metric;

wherein said instructions to revise include instructions to update a particular binary sequence of said set of binary sequences so as to increase the number of said network addresses represented;

wherein said instructions to update include instructions to determine said revision metric based upon the percentage of said network traffic having said identifiers correlating to said particular binary sequence, and based upon the number of network addresses within said one or more network addresses, said instructions to update further including instructions to shorten said particular binary sequence according to an evaluation of said revision metric.

13. The computer readable memory of claim 12 wherein said instructions to establish include instructions to establish binary sequences each having a long term count value for noting an amount of said network traffic received from said one or more network addresses and a short term count value for updating said long term count value, and wherein said instructions to correlate include instructions to increment said short term count value and instructions to periodically incorporate said short term count value into said long term count value.

14. The computer readable memory of claim 12 wherein said instructions to revise include instructions to revise said set of binary sequences so as to correlate a greater number of said identifiers to a smaller number of said network addresses.

15. The computer readable memory of claim 12 further including instructions to block said network traffic upon correlating said identifiers to selected binary sequences within said binary tree.

16. The computer readable memory of claim 15 wherein said instructions to receive include instructions to receive malicious network traffic involved in a distributed denial of service attack and benign network traffic not involved in a distributed denial of service attack, and wherein said instructions to block include instructions to identify selected binary sequences for blocking a large amount of said malicious network traffic while blocking a small amount of said benign network traffic.

17. The computer readable memory of claim 15 wherein said instructions to correlate include instructions to correlate said identifiers so as to produce identified network traffic, and said instructions to block include instructions to block said identified network traffic according to the rate at which said identified network traffic is received.

18. The computer readable memory of claim 17 wherein said instructions to block include instructions to block said identified network traffic according to a token bucket rate limiting scheme.

19. The computer readable memory of claim 17 wherein said instructions to block include instructions to block said identified network traffic according to a dual token bucket rate limiting scheme.

20. A computer implemented method of classifying information utilizing a binary tree for identifying a distributed denial of service attack, comprising:

establishing a binary tree including a set of binary sequences, each binary sequence of said set of binary sequences representing one or more network addresses;

receiving network traffic;

identifying a distributed denial of service attack associated with said network traffic utilizing said binary tree; and dynamically revising said set of binary sequences to reflect changes in said network traffic;

wherein said dynamically revising includes updating a particular binary sequence of said set of binary sequences so as to increase the number of said network addresses represented;

wherein said updating includes determining a revision metric based upon the percentage of said network traffic having identifiers correlating to said particular binary sequence, and based upon the number of network addresses within said one or more network addresses, said updating further including shortening said particular binary sequence according to an evaluation of said revision metric.

21. A computer program product embodied on a computer readable medium for classifying information utilizing a binary tree for identifying a distributed denial of service attack, comprising:

computer code of establishing a binary tree including a set of binary sequences, each binary sequence of said set of binary sequences representing one or more network addresses;

computer code for receiving network traffic;

computer code for identifying a distributed denial of service attack associated with said network traffic utilizing said binary tree; and computer code for dynamically revising said set of binary sequences to reflect changes in said network traffic;

wherein said dynamically revising includes updating a particular binary sequence of said set of binary sequences so as to reduce the number of network addresses represented;

wherein said updating includes determining a revision metric based upon the percentage of said network traffic having identifiers correlating to said particular binary sequence, and based upon the number of network addresses within said one or more network addresses, said updating further including lengthening said particular binary sequence according to an evaluation of said revision metric.

* * * * *

UNITED STATES PATENT AND TRADEMARK OFFICE
CERTIFICATE OF CORRECTION

PATENT NO.         : 7,203,963 B1                                                                Page 1 of 1
APPLICATION NO.    : 10/172740
DATED              : April 10, 2007
INVENTOR(S)        : Wu et al.

It is certified that error appears in the above-identified patent and that said Letters Patent is hereby corrected as shown below:

col. 14, line 46 replace "of" with --for--.

Signed and Sealed this

Second Day of February, 2010

David J. Kappos
*Director of the United States Patent and Trademark Office*